(12) United States Patent
Rutz et al.

(10) Patent No.: US 9,418,282 B2
(45) Date of Patent: Aug. 16, 2016

(54) METHOD AND DEVICE FOR AUTHENTICATING DOCUMENTS MARKED WITH PHOTOCHROMIC SYSTEMS

(75) Inventors: Alfred Rutz, Trin (CH); Alexander Ruegg, Baden (CH)

(73) Assignee: U-NICA Technology AG, Malans (CH)

(*) Notice: Subject to any disclaimer, the term of this patent is extended or adjusted under 35 U.S.C. 154(b) by 154 days.

(21) Appl. No.: 13/988,214

(22) PCT Filed: Nov. 22, 2011

(86) PCT No.: PCT/CH2011/000276
§ 371 (c)(1),
(2), (4) Date: May 17, 2013

(87) PCT Pub. No.: WO2012/083469
PCT Pub. Date: Jun. 28, 2012

(65) Prior Publication Data
US 2014/0044337 A1    Feb. 13, 2014

(30) Foreign Application Priority Data

Dec. 22, 2010 (CH) ........................ 2153/10

(51) Int. Cl.
G06K 9/00 (2006.01)
G07D 7/20 (2016.01)
G07D 7/12 (2016.01)

(52) U.S. Cl.
CPC .............. *G06K 9/00442* (2013.01); *G07D 7/12* (2013.01); *G07D 7/20* (2013.01)

(58) Field of Classification Search
None
See application file for complete search history.

(56) References Cited

U.S. PATENT DOCUMENTS

| 5,289,547 A | 2/1994 | Ligas et al. |
| 5,960,411 A | 9/1999 | Hartman et al. |
| 6,616,964 B1 | 9/2003 | Hampp et al. |
| 2003/0178281 A1* | 9/2003 | Goto ............... G07F 19/20 194/206 |

(Continued)

FOREIGN PATENT DOCUMENTS

| DE | 19914702 A1 | 10/2000 |
| EP | 1 171 309 A1 | 1/2001 |

(Continued)

OTHER PUBLICATIONS

Mehtre, Babu M. et al. "Content-Based Image Retrieval Using a Composite Color-Shape Approach," Information Processing & Management, vol. 34, 1998, 12 pages.*

(Continued)

*Primary Examiner* — Sumati Lefkowitz
*Assistant Examiner* — Ryan P Potts
(74) *Attorney, Agent, or Firm* — Sughrue Mion, PLLC

(57) ABSTRACT

A method for checking the genuineness of a security feature on a security document. The security feature exhibits an alteration in the visible range when excited by a flash of light. The method comprises taking at least one first image of the unexcited security feature using a mobile telephone camera with an integrated flash function. Then, exciting at least one second image of the security feature using the flash function of the same mobile telephone. Optionally, setting up a wireless link using the telephone function or an Internet function on the mobile telephone, and at least one or both of the images or an authentication function derived from the difference between the two images is/are transmitted to a receiver having a database, the authentication is evaluated and/or the authentication is logged with the receiver.

32 Claims, 6 Drawing Sheets

(56) References Cited

U.S. PATENT DOCUMENTS

| | | | |
|---|---|---|---|
| 2005/0047593 A1* | 3/2005 | Hampp | G07D 7/20 380/54 |
| 2005/0078851 A1 | 4/2005 | Jones et al. | |
| 2008/0267514 A1* | 10/2008 | Alasia et al. | 382/232 |
| 2009/0187435 A1 | 7/2009 | Carr et al. | |
| 2010/0118179 A1* | 5/2010 | Ciudad | H04N 5/2354 348/371 |
| 2010/0177896 A1* | 7/2010 | Walter | H04L 63/166 380/270 |
| 2010/0200649 A1 | 8/2010 | Callegari et al. | |
| 2010/0235726 A1* | 9/2010 | Ording | G06F 1/1626 715/234 |

FOREIGN PATENT DOCUMENTS

| | | |
|---|---|---|
| EP | 1 158 459 A1 | 11/2001 |
| EP | 1 404 526 A1 | 4/2004 |
| EP | 1 690 697 A1 | 8/2006 |
| EP | 1 986 162 A1 | 10/2008 |
| TW | 200634671 A | 10/2006 |
| TW | 200902339 A | 1/2009 |
| WO | 2007006242 A1 | 1/2007 |
| WO | 2009/115611 A2 | 9/2009 |
| WO | 2009/141614 A1 | 11/2009 |
| WO | 2010/023243 A1 | 3/2010 |
| WO | 2010/124908 A1 | 11/2010 |

OTHER PUBLICATIONS

Hampp, Norbert. "Bacteriorhodopsin as a photochromic retinal protein for optical memories." Chemical Reviews 100.5 (2000): 1755-1776. 22 pages.*

N. Hampp, et al., "Multifunctional Optical Security Features based on Bacteriorhodopsin", Proc. of SPIE—IS&T Electronic Imaging, Jan. 1, 2004, pp. 117-124, vol. 5310, XP-002584224.

Dieter Oesterhelt, et al., "Bacteriorhodopsin: a biological material for information processing", Quarterly Reviews of Biophysics, 1991, pp. 425-478, vol. 24, No. 4.

Communication dated Jan. 15, 2015 from the State Intellectual Property Office of the People's Republic of China in counterpart application No. 201180062488.5.

English Translation of Office Action dated Jul. 9, 2015, issued by the Intellectual Property Office of Taiwan in counterpart Taiwanese Patent Application No. 100147299.

Communication dated Mar. 11, 2016 from the Taiwanese Intellectual Property Office in counterpart application No. 100147299.

* cited by examiner

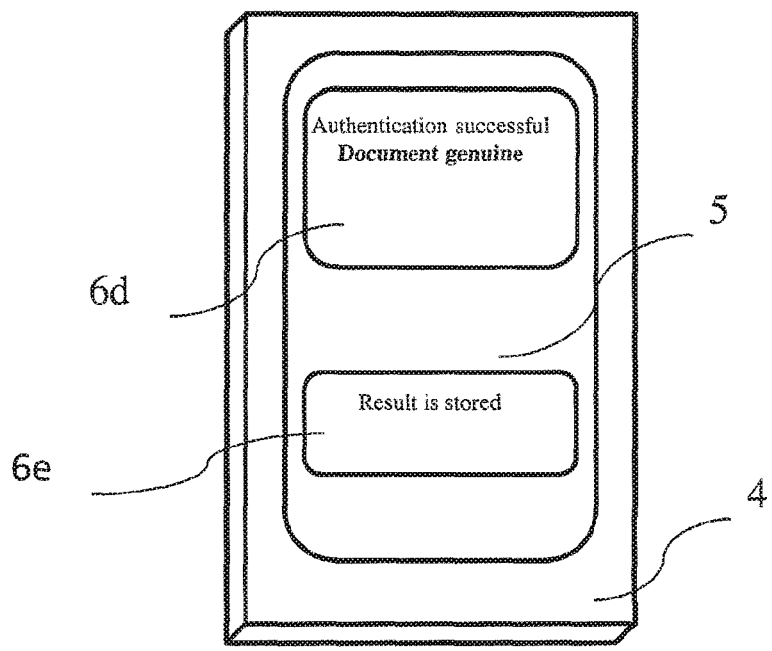
FIG. 2e
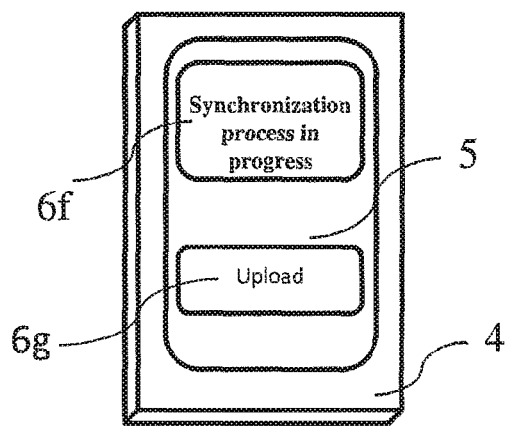
FIG. 2f-1
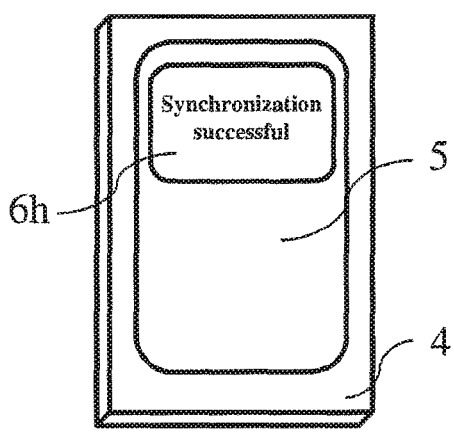
FIG. 2f-2
FIG. 2f

METHOD AND DEVICE FOR AUTHENTICATING DOCUMENTS MARKED WITH PHOTOCHROMIC SYSTEMS

CROSS REFERENCE TO RELATED APPLICATIONS

This application is a National Stage of International Application No. PCT/CH2011/000276, filed on Nov. 22, 2011, which claims priority from Swiss Patent Application No. 02153/10, filed on Dec. 22, 2010, the contents of all of which are incorporated herein by reference in their entirety.

TECHNICAL FIELD

The present invention relates to methods and apparatuses for authenticating forge-proof documents having photochromic security features from the class of retinal proteins and also to products suitable for use in such methods, such as, in particular, protected documents, such as passports, banknotes, certificates and identity cards.

PRIOR ART

Highly protected documents in the form of paper documents such as passports, banknotes and those with a card-like design, but also documents for protecting the originality of a product, such as guarantee certificates, declarations of compliance and original packaging, increasingly require networked security in the shape of security features on the document and also, by way of example, the storage of said security features in a central database.

Ideally, individual authentication is performed using a mobile appliance which is wirelessly linked to a server-assisted central database. By way of example, such an appliance is a mobile telephone, the software of which can set up an at least intermittent connection to a server in order to perform data synchronization or the like, for example. The networking of these data amounts to a relatively high degree of security against forgery.

This has already been described in US2009/0187435, for example.

At the same time, the networking of the security features can allow not only the increased security but also statistical evaluation of the central database, which is beneficial in diverse ways. This can include the regional use or else the number of verifications per document, and it is particularly worth mentioning the commercial use of the authentication using a "one-click" method, as is not uncommon in the case of online training facilities and as has been described in U.S. Pat. No. 5,960,411, for example.

A particular advantage in such an application is enjoyed by security features which can be recognized both visually with the naked eye and effectively as confirmation of the first check, performed by the eye, using a mobile appliance as a second check, provided that these checks have an optical pickup system such as a hand-held scanner or a mobile telephone with a camera. A particular benefit arises for the checker of the document if the mobile appliance is able to recognize further properties of the security feature (particularly those that are concealed from the naked eye) and therefore removes doubt about authentication having failed. Failed authentication can also be understood to mean false-positive verification with the naked eye.

In further consequence, the link to a central server is able to turn the security feature into a comprehensive security system which is preferably networked worldwide.

In connection with barcode technology, abundant use is made of mobile telephones (cf. WO2009/141614, for example), but these suffer from it being a simple matter to forge a barcode and from the latter having little or no redundancy, which is necessary for effective forge-proofing of highly sensitive documents, if it is not linked to further security features or properties.

PRESENTATION OF THE INVENTION

It is accordingly one of the objects of the present invention to provide a method for verifying security features. In particular, this involves allowing a method for verifying security features using ordinary mobile telephones and/or smartphones.

As a result of the fact that today such mobile telephones are also equipped with a camera and with a flash function more or less as standard, they are found to be suitable, surprisingly without particular additional hardware measures, as a highly sensitive verification appliance, which can be incorporated into central data management, for a quite particular class of security features, namely of photochromic security features. This is because it is found that these appliances, particularly when equipped with a specific data processing program for implementation, are excellently capable of ascertaining precisely the characteristic properties of such security features, and at the same time of optionally also transmitting the relevant information to a central database, either for the purpose of verification on this central database or for the purpose of book-keeping on this central database.

Photochromic security features, particularly those based on retinal proteins, which, besides their visual conspicuousness as a result of their colour changing behaviour, also have further properties, the cause of which is the complex electronic state changes of the molecules, are particularly suitable for multidimensional security features which, in the first stage, can also be verified visually using the naked eye. Thus, besides the change of colour, which can easily be induced by radiation with sunlight, for example, and can be reversed again in the dark, the optical activity thereof as a result of radiation with polarized light and the benefit thereof as an optical data storage material can also be cited.

A commercially manufacturable representative of this substance class which may be cited is particularly bacteriorhodopsin. Bacteriorhodopsin and particularly bacteriorhodopsin in its customarily available form as two-dimensional crystalline patches comprising complex compounds with the purple membrane is an intensively examined system. The system is of great interest particularly because, as an extremely resistant optical system, it is capable of adopting the aforementioned different optical states and of switching to and fro between the two states as often as desired. Preference is given to such variants of the bacteriorhodopsin purple membrane complex as have long switching times between these optical states in the region of several seconds, so as to allow better recognition of the state change. Thus, by way of example, the mutant D96N involves a transition from the light-adapted (mustard yellow) state to the dark state (violet) with a half-life of approximately 20 s. The retinal protein complex of bacteriorhodopsin type with suitable photocycles has been described in detail (cf. EP-A-1 171 309, for example). In principle, it is possible for bacteriorhodopsin purple membrane complexes with suitable properties to be provided as a precursor for further processing, for example for the manufacture of printing inks in a form which is suitable for industrial use, i.e. stable (cf. WO2010/124908, for example). The use of the wild type with significantly shorter switching times is also sufficient for purely instrumental control of the photochromic reaction, but it is not always preferred.

The use of the bacteriorhodopsin purple membrane complex as a photochromic marker as a feature for protected documents is documented by DE-A-19914702 or U.S. Pat. No. 6,616,964, and the protection of highly protected documents such as banknotes in general is described in EP-A-1 404 526. The property of this substance class as an optical medium for data storage or for other technical applications is likewise documented (Oesterhelt et al., A Biological Material for Information Processing, Quarterly Reviews of Biophysics 24 (1991) 425-478). This class of retinal proteins thus involves systems which are highly attractive commercially for different applications, their property of light-induced colour change being significant for this invention.

In other words, for the colour change of photochromic security features, particularly, but not exclusively, of those based on bacteriorhodopsin purple membrane complex, the transition of which is distinctly characteristic and hence very suitable for authenticating a document, an easily available resource is proposed, preferably a mobile telephone with integrated flash, which can bring about the change of colour through exposure to light, can recognize the change of colour, can use the change of colour for verification and can optionally store the result of this verification via a mobile radio link in a database, where it can be statistically evaluated, for example, and can be used particularly as a basis for settling the verification process (pay-per-authentication), but where it can also be verified, in principle (the verification can but does not have to take place on the mobile telephone). To date, the prior art has not allowed all of these functions to be provided in one hand-held appliance and has furthermore been unable to provide a solution for the documentation and commercial remuneration of an individual verification to date. A surprising aspect, as already explained at the outset, is the realization that a mobile telephone as can be found on almost anyone today and which can be equipped with suitable supplementary programs in the simplest of ways, that is to say what is known as a smartphone with dedicated applets, for example, is able to solve this problem provided that it contains an additional illumination or flash apparatus, preferably an integrated flash, as is the case with the currently available models Apple iPhone 4 or HTC Desire, for example, but also with many others.

Specifically, the present invention relates to a method for checking the genuineness of a security feature, particularly on a security document, but also, by way of example, on a package or the like, which is characterized in that the security feature is a security feature whose appearance in the visible range when excited by a flash of light exhibits an alteration.

The method is distinguished by the following steps:
I. taking at least one first image (or film, or else just a characteristic function) of the unexcited security feature using a mobile telephone which simultaneously has a camera with an integrated flash function;
II. taking at least one second image (or a film, or else just a characteristic function) of the security feature excited using the flash function, using the same mobile telephone;
with the proviso that the order of steps I. & II. may also be converse.

Optionally the method is further distinguished by the following step:
III. setting up a wireless, typically protected, link using the telephone function or an Internet function on the mobile telephone, and transmitting at least one or both of the images or an authentication function derived from the difference between the two images, to a receiver having a database, evaluating the authentication at the receiver and/or logging the authentication with the receiver. Preferably, the mobile telephone with the onboard software performs the authentication, and the collected results are transmitted in the course of later synchronization with the server. Particularly preference is thus given to carrying out the verification with the dedicated onboard software and to the transmission of the results in packets to the server on the next link which is set up. In the course of such synchronization, it is also possible for the application software or an update to be downloaded onto the telephone.

In accordance with another embodiment of the method, however, after step III. the receiver can transmit the result of the authentication to the mobile telephone too, and this result is output on the mobile telephone on a display or by means of an audio interface.

After step III. it is possible, either immediately or if appropriate also only after the accumulation of enough authentication processes, for the receiver to directly or indirectly output a report to the mobile telephone and/or via a different communication path with a statistical evaluation and/or invoicing.

As already mentioned at the outset, the security feature is preferably a photochromic security feature which in this case exhibits a change of colour and/or change of shape under the action of the flash. In this context, a change of shape is understood to mean the contour of a character or the like, for example, which is changed via the action of light.

As already explained in detail further above, the security feature may preferably be a security feature based on a retinal protein, particularly based on bacteriorhodopsin, preferably in its form incorporated in the purple membrane, wherein the bacteriorhodopsin preferably stems from the wild type of the halobacterium and is particularly preferably a mutant of type D96N.

In this case, in step I. the dark-adapted state of the bacteriorhodopsin is measured using the first image and in step II. the light-adapted state of the bacteriorhodopsin is measured, wherein preferably the light-adapted state is measured for more than one instant after the excitation.

The images can also be taken and evaluated in the form of a film or in the form of at least one image within the context of step I., and at least two, preferably at least three, images taken with delayed timing within the context of step II.

After step II. the mobile telephone can perform an authentication check from the at least two images using a suitable data processing program on the mobile telephone, and the result of this check can be output by means of a display or an audio interface on the mobile telephone and/or transferred to the receiver in step III.

In accordance with one preferred embodiment, the security feature may be arranged on a security document, wherein the security document may be an identification document, a travel document, a banknote, a certificate, a cheque, a package, a guarantee certificate or a share certificate.

Prior to step I. the security feature can, in order to safeguard a defined state for the snapshot without specific action of light, be protected against the action of light, and step I. can be performed essentially immediately afterwards. By way of example, the protection against light can be accomplished by covering with an article which is impervious to light, for example the mobile telephone can be placed directly onto the security feature and can then briefly be removed from the security document to a sufficient extent for the snapshot. In this case, the relevant instructions for how this method can be performed can advantageously be displayed on the display of the mobile telephone. Preferably, the mobile telephone thus holds a data processing program which provides the user with the exact instructions for carrying out the method in its chronological order by means of the display on that side which is remote from the camera or the lens thereof. By way of example, the procedure following activation of the data processing program might comprise: 1. Please place the mobile telephone onto the security feature so that it is protected from the influence of light; 2. During a defined period of 20 s, for example, the display then automatically indicates that the position needs to be maintained without alteration; 3. The following is then output: please remove the mobile telephone swiftly at right angles from the security document to a distance of 15 cm and immediately press the shutter release; 4. Next, after the data processing program has automatically activated the flash function, the following is output: please press the shutter release again; 5. Next, if a verification result cannot be output immediately, it is indicated that it is necessary to wait; 6. The verification result (yes/no or genuine/not genuine or the like) is output on the display, if appropriate in combination with an indication of the probability of the correctness of the statement.

Alternatively, it is moreover also possible for the entire verification to be effected by taking a film, in which case the film function actually needs to be initiated only once, this being able to be done either using the shutter release or automatically by means of the data processing program, and the data processing program then uses the display to guide the user automatically by instructing him how to move the mobile telephone relative to the security feature and automatically performing the remaining steps, for example, triggering a flash at the correct instant when the mobile telephone is in the correct position.

The flash function may in general be an LED flash function.

The mobile telephone may be a smartphone having a touch-sensitive display which can be used to initiate an appropriate data processing program which controls the authentication process, wherein preferably this data processing program has an image recognition function which can ascertain both colour alterations and shape-oriented alterations in the security feature and can evaluate relative differences between the first and second images, if appropriate using a local database arranged on the mobile telephone and/or using the database of the receiver.

The data processing program which controls the method and runs on the mobile telephone can either simply transmit the raw data (taken images or film) to a certain extent or else can calculate an authentication function from the at least two images (preferred but not exclusive form) and then transmit said authentication function to the receiver.

Within the context of such transmission processes, it is also additionally possible for software or software updates to be automatically transmitted from a central database or a provider to the mobile telephone. The invention thus also relates to a data processing program which can be downloaded from a server onto the mobile telephone.

The wireless link within the context of step III. is preferably a protected Internet connection.

Furthermore, the present invention relates to the use of a mobile telephone in a method, as has been explained above, wherein the mobile telephone has means for setting up a mobile telephone link and/or has means for setting up an Internet connection, and also has a camera and has a flash function. In other words, the concept of a mobile telephone can be understood broadly, and it also includes apparatuses which have only means for setting up an Internet connection and also have a camera and have a flash function.

The present invention also relates to a data processing program which can be executed on a mobile telephone and which can be stored or which is stored thereon for carrying out the method explained above, i.e., to a computer program comprising code which, when executed, causes a processor of the mobile phone to carry out such a method. The computer program can in particular be provided as a computer program product on a suitable data carrier, for example on a CD-ROM, on a flash memory etc., or can be provided for download over a network. It can be provided in any form, for example as a source code, object code or machine code. The invention further relates to a mobile telephone on which such a program is stored and executable. The document may comprise a polymer, and it may preferably be a film or have a multilayer film structure.

By way of example, the security document may also be a laminate comprising at least one first paper layer and an at least second polymer layer, and it may be an identification card, for example.

The actual measurement in this case is typically a difference measurement for the brightness or colour of the colouring component on the basis of BR in order to produce a result for the verification state. Since the fact that two different snapshots need to be manually taken means that it is not possible in every case to ensure that simple superposition of the images is sufficient for the difference measurement, it may be advantageous for the evaluation to involve carrying out an automated relative positioning and/or scaling of the two snapshots before the difference is ascertained. For this purpose, elements may be provided for pattern recognition in the data processing program or control program. Alternatively or in addition, it is possible for taking of the first image to be followed by the display being used to instruct the user to make the first image shown as background overlap the display and to press the shutter release only when this overlap has been ensured.

The application software can typically be started using at least one first symbol (icon or app) on the display of the apparatus.

The data in the database can be used particularly for a payment system for services which include the authentication of the document.

In summary, in accordance with further preferred embodiments, the invention may have one or more of the following elements:

1. An at least first security element having a photochromic feature, preferably based on a retinal protein, particularly preferably based on a bacteriorhodopsin purple membrane complex.
2. A document which is protected with this security element, wherein the document is a passport, an identity card, a banknote, a certificate or another document in this category. Furthermore, documents in the broader sense such as packages can also be understood, which contain goods worthy of protection, such as spares or luxury brand articles.
3. A mobile apparatus which is preferably readily available to anyone more or less ubiquitously and is equipped with or connected to a light source, for example a—preferably integrated—flashlight unit, LED or halogen light source. Furthermore, this apparatus is provided with a scanner or camera in order to recognize the optical function of the photochromic first feature. In addition, the mobile apparatus is equipped with a screen or a display in order to be able to orient the apparatus to the security element and present the verification result. Furthermore, this mobile apparatus can forward the verification result for the purpose of further evaluation to a central database or a central server which is linked to a database. The link is made via the Internet and can be set up using standard transmission methods such as W-LAN, G3/UMTS or EDGE. For these requirements, appropriately equipped mobile telephones (smartphones) or a hand-held scanner are suitable, in particular.

4. Verification software in order to be able to perform the verification and data transmission with said apparatus. Preferably, the verification process or the software required for this purpose can be activated using an icon (app) on the display of the apparatus.

5. The verification of the at least one security feature using a sequence of snapshots by means of the camera or the scanner with and without an activated light or flashlight source and also evaluation of the verification result and forwarding thereof to the central database or the server with the central database.

6. The result of the verification (yes/no) is evaluated by means of a server which is integrated in a protected network, e.g. a web server with an https protocol, and at least intermittently has a connection to the mobile apparatus. However, the data can naturally also be transmitted in other formats, e.g. as feeds via RSS or the Atom protocol. In this case, the server is used not only for purely collecting the data but also performs statistical evaluation thereof, particular mention being able to be made of settlement.

The cited apparatus having the components camera/scanner, light/flash source and display may also be suitable as a pure resource without a server link for verification, so that besides purely visual observation of the feature (security feature on the first level), verification is possible with this tool and hence turns the bacteriorhodopsin marker into a security feature on the second level and improves the reliability of the verification. The data processing program on the mobile telephone can, moreover, also provide appropriate auxiliary services, for example advice of where particular care should be taken for which security feature during the optical verification, etc., immediately for the purely visual verification too.

There is furthermore the additional, but not absolutely necessary, option of recording a second security feature, which is amenable to optical evaluation, during the same authentication process. Such a feature may be a colour code or numerical code, a pattern as described in EP-A-1690697 for example, or a microstructure (WO2009/115611). Combinations of a first feature with a second feature, which is a random microstructure, as a security feature for verification using a camera-fitted or scanner-fitted apparatus have been described (WO2010/023243) and can ideally be authenticated using an apparatus according to this invention, and the same data processing program may particularly preferably be designed for this purpose. Thus, by way of example, the data processing program can interactively instruct the user to sequentially read or verify the different security features.

Accordingly, in summary, the present invention relates to an apparatus and a method for inducing and tracking the visible change of colour in a BR-PM complex, for example, during the transition from the dark-adapted state to the light-adapted state, the method being used to authenticate a security document and the results of the authentication optionally being able to be transmitted to a central server or a central database, and the data collected therein being amenable to statistical evaluation, for example, and optionally being able to be used as a basis for a payment system. The apparatus and the method allow the checker of the security document to additionally track the authentication visually too, so that visual authentication, performed at the same time with the apparatus, of the same document allows redundancy and hence a high-quality result for the authentication.

Furthermore, the invention relates to security documents for use in such a method, particularly characterized, by way of example, in that they contain bacteriorhodopsin as a security feature. In this case, the security document may be of paper, for example, and/or comprise a polymer, and/or may be a laminate. The substrate of the document may also be a card. In addition, such a document may preferably have a second optically recognizable security feature which can be brought into the capture range of the camera, for example when the latter is picking up the first security feature.

BRIEF DESCRIPTION OF THE DRAWINGS

Preferred embodiments of the invention are described below with reference to the drawings, which are merely used for explanation and can be interpreted as non-limiting. In the drawings.

DESCRIPTION OF PREFERRED EMBODIMENTS

Figure 1:
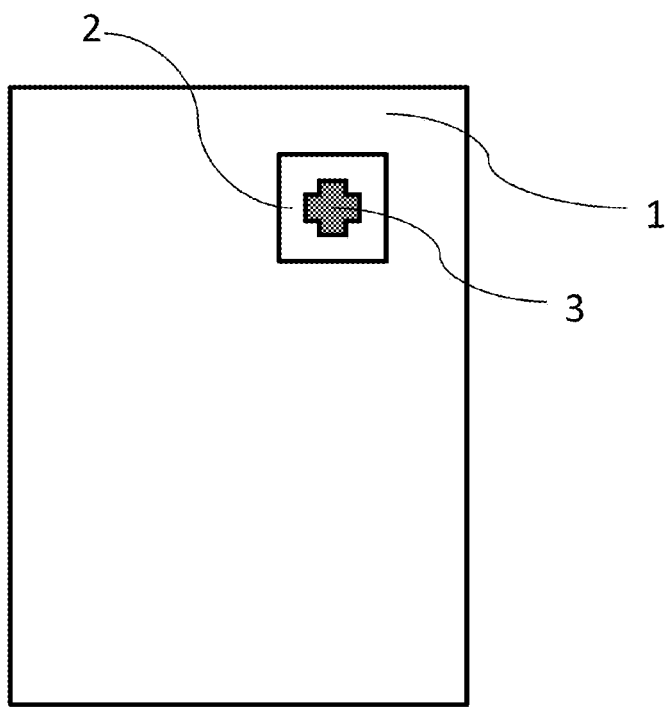
FIG. 1 shows a security document with an image element containing an at least first security feature comprising a BR-PM formulation applied by printing.

The mobile apparatus is, as can be recognized particularly from FIG. 2, a smartphone 4 having a large display 5 which, when a graphical symbol 6 (icon or app) is touched, can start a piece of software and can present an easily recognizable live image of the document which is arranged on the other side of the telephone. In addition, this mobile telephone 4 has an integrated flash unit 9 which can initiate the change of colour in a bacteriorhodopsin purple membrane complex to a lighter shade. In the present case, the bacteriorhodopsin purple membrane complex is included in a formulation which has been applied to the document (cf. FIG. 1, for example) using a printing method. In this complex, the bacteriorhodopsin variant is mutated at position 96 in the opsin in comparison with the wild type and therefore has a switching time which is convenient for the change of colour and which can easily be tracked with the naked eye and/or this instrument in the range from 0.5 to 30 seconds, preferably 2 to 20 seconds. The document to be authenticated (cf. FIG. 1) contains a logo, for example applied by means of screen printing, as image element 2, which contains the described opsin complex as a colouring substance. In this case, by way of example, temporary covering of the security feature 3 is used to ensure that this document 1 is not exposed to the light prior to the authentication 17 using the mobile telephone 4, so that the logo appears in the lilac-coloured tone of the dark-adapted opsin. The mobile telephone 4 takes the image of the document 1a (instant T1) and presents it on the display 5 so that the checker 15 can satisfy himself as to this colour (cf. particularly FIG. 2c). At the same time, this first image is stored in the appliance 4. Next, this mobile telephone takes a second snapshot using the flashlight (instant T2) (cf. particularly FIG. 2d). This snapshot is also presented on the display so that the checker 15 can satisfy himself as to the now light-adapted, light shade. In this second image, the shade can lighten to mustard yellow or light yellow. However, it is sufficient for a first visual verification 16 if the checker recognizes only lightening of the previously lilac-coloured tone. This image is also stored in the telephone 4. Prior to the first snapshot, the checker touched an icon 6 on the display 5 in order to start a software application which controls the further execution of the process. After the second image, the software compares, possibly after appropriate adjustment of the relative orientation, etc., the brightness of the two differently exposed images against one another and recognizes the change of colour in the opsin complex in the logo of the document. If the change of colour is significant, the telephone uses the display to indicate that the authentication was successful and ascertains the result. The authentication is successful if the difference in the colour locations of the two opsin states, in the simplest case a difference in the brightness of the opsin, exceeds a particular threshold value 10. The result of this evaluation is presented to the checker using the image as a clear statement, e.g. as "genuine" or "non-genuine".

Figure 2A:
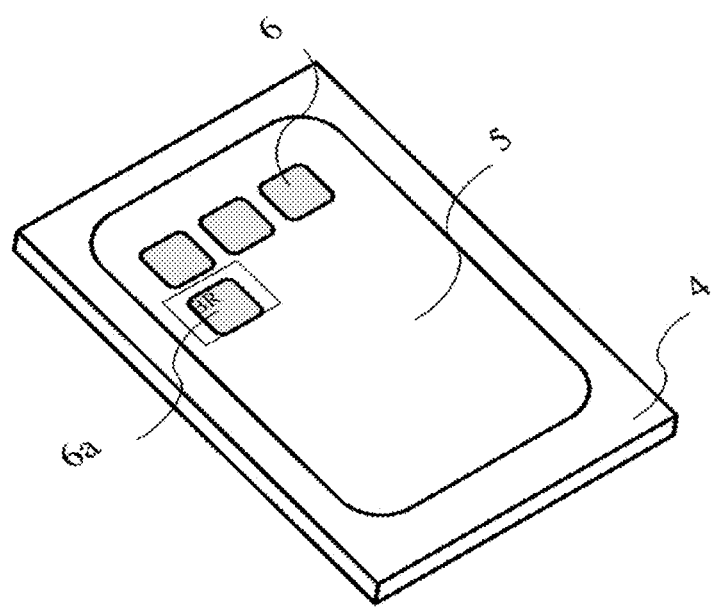
FIG. 2 shows in a) a mobile telephone with a touch-controlled display containing pictograms (app) for starting application programs which are installed in the telephone, wherein at least one pictogram starts the application for the authentication according to the invention; in b) the back of the mobile telephone, i.e. the side which faces the security document during the verification process, with a camera and an integrated flash unit; in c) the authentication of the security document using the mobile telephone after the authentication program has started, wherein the dark-adapted state of the security feature is recognized by the checker visually on the display and is stored as an image in the memory of the telephone, wherein the flash integrated in the telephone is not used, wherein the dark-adapted state can be ensured by brief prior darkening of the security feature, for example using a board which is impervious to light, and wherein a further input request results in the production of the light-adapted form and in the image thereof as a file in the telephone memory; in d) the second step of authenticating the security document using the mobile telephone, wherein the light-adapted state of the security feature 3b is recognized by the checker visually on the display and is stored as an image in the memory of the telephone, wherein the flash integrated in the telephone is used in order to bring about the light-adapted state of the feature, and wherein a further input request results in computing the result of the authentication; in e) a display of the authentication result ascertained from the measurement of the difference in the luminance of the image of the feature between the first and second measurements, and the comparison of this value with a reference value which has been set as a threshold value for the difference in the luminance, wherein it is possible to store the result which will be transmitted during the next synchronization of the mobile telephone with the central server together with all previous results from the authentication processes since the last synchronization to this server; in f) specifically in FIG. 2f-1, a telephone display during the synchronization with the central server, wherein the advice points to the process in progress, wherein the further advice points to the fact that at this instant the data from the authentication are uploaded from the telephone memory to the server; and in FIG. 2f-2 a telephone display with the message indicates the end of the synchronization, with all authentication processes performed from now on producing results which are collected in the memory of the telephone and are transmitted to the server during the next synchronization.
Figure 2B:
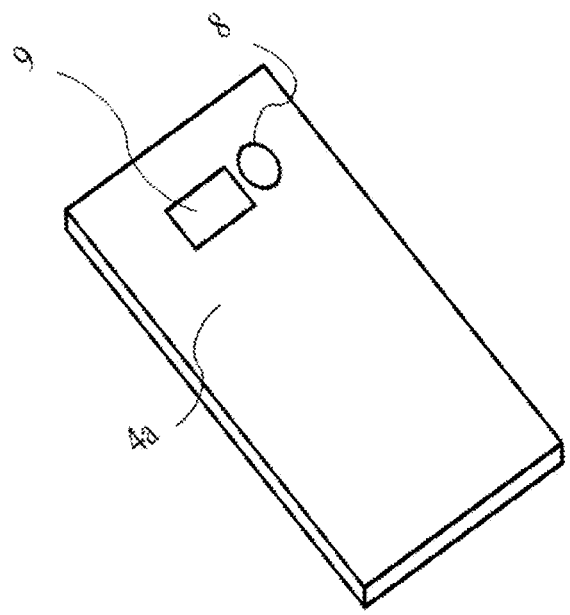
Figure 2C:
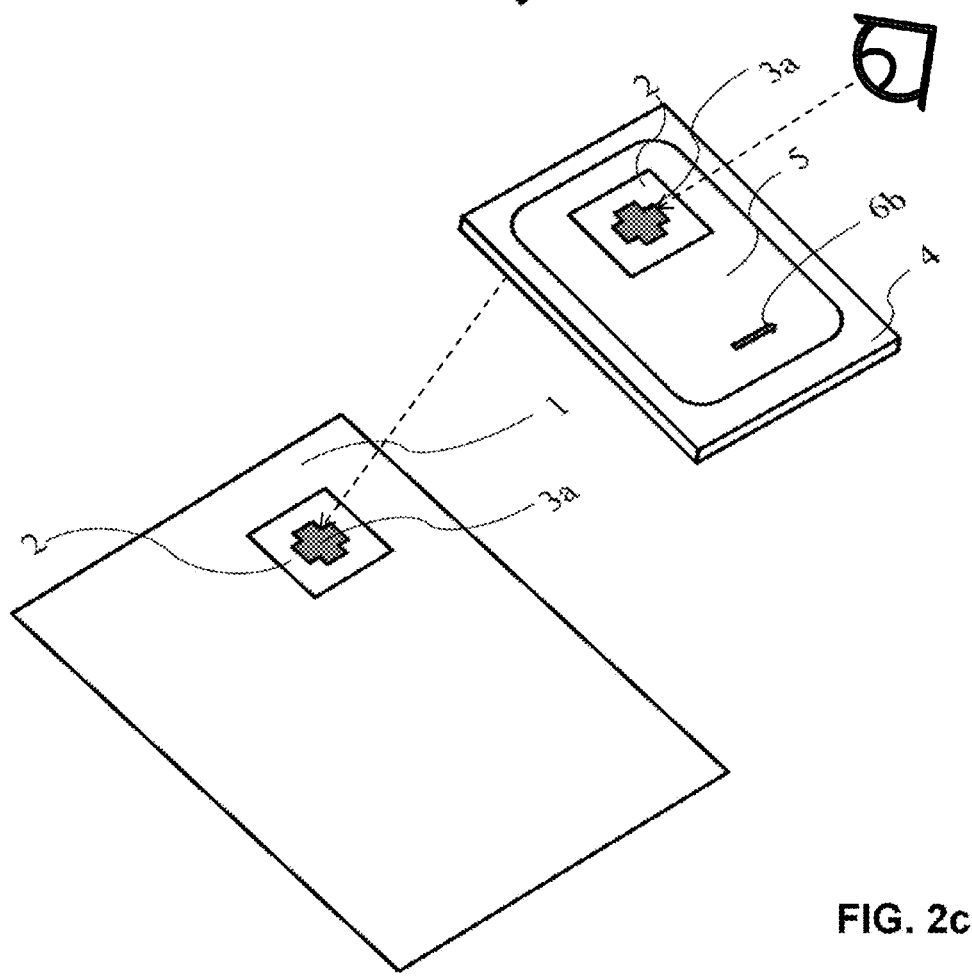
Figure 2D:
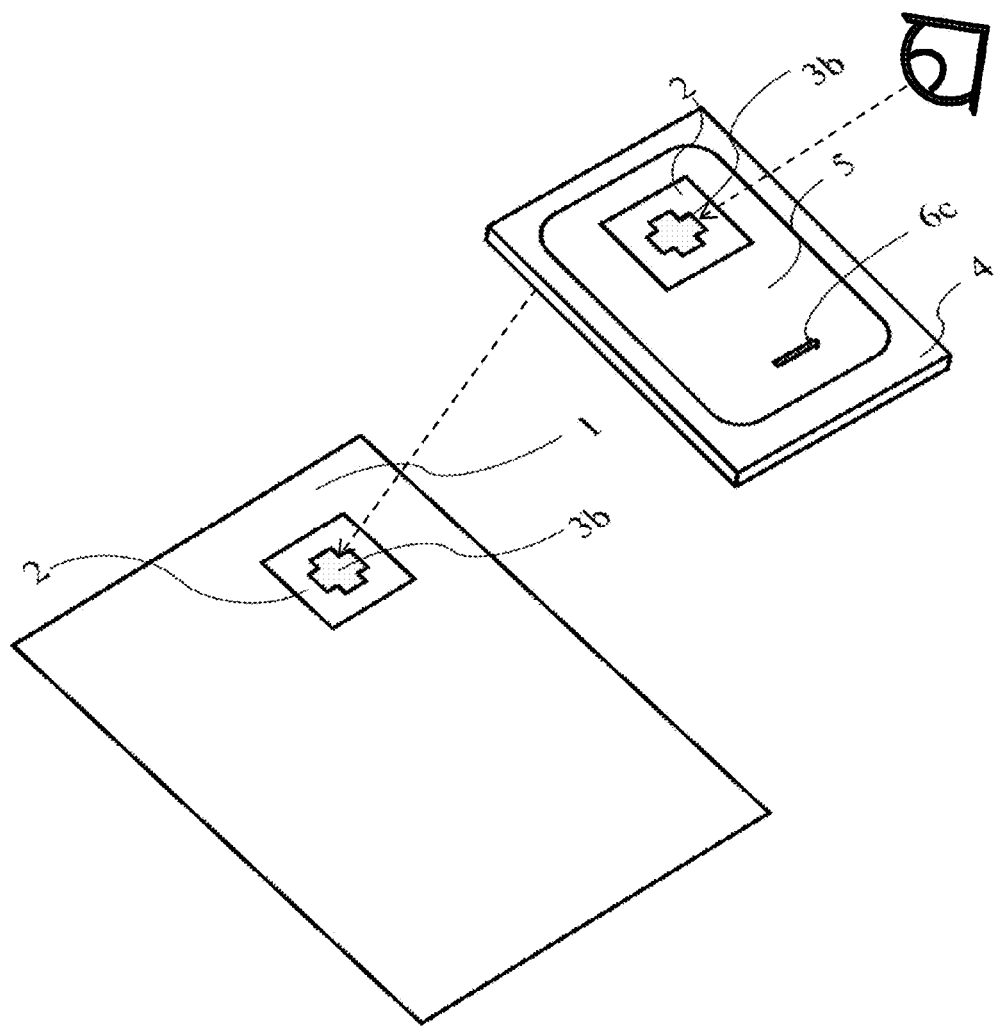
Figure 3:
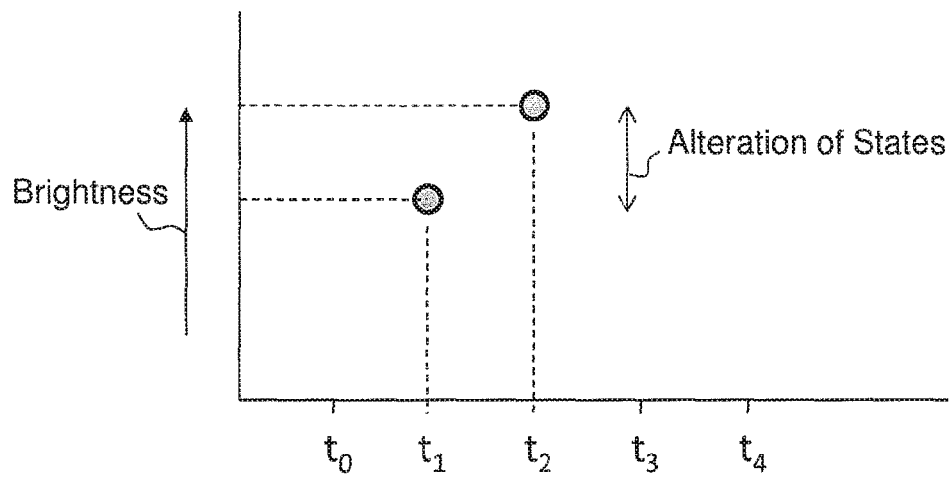
FIG. 3 shows the chronology of the authentication process, where $t_0$ is the start of the authentication; $t_1$ is the measurement of the reflected luminance of the dark-adapted security feature; $t_2$ is the measurement of the reflected luminance of the light-adapted security feature; $t_3$ is the calculation of the luminance difference and comparison with the stored reference value; and $t_4$ is the output of the result in the form of genuine/non-genuine statements.
Figure 4:
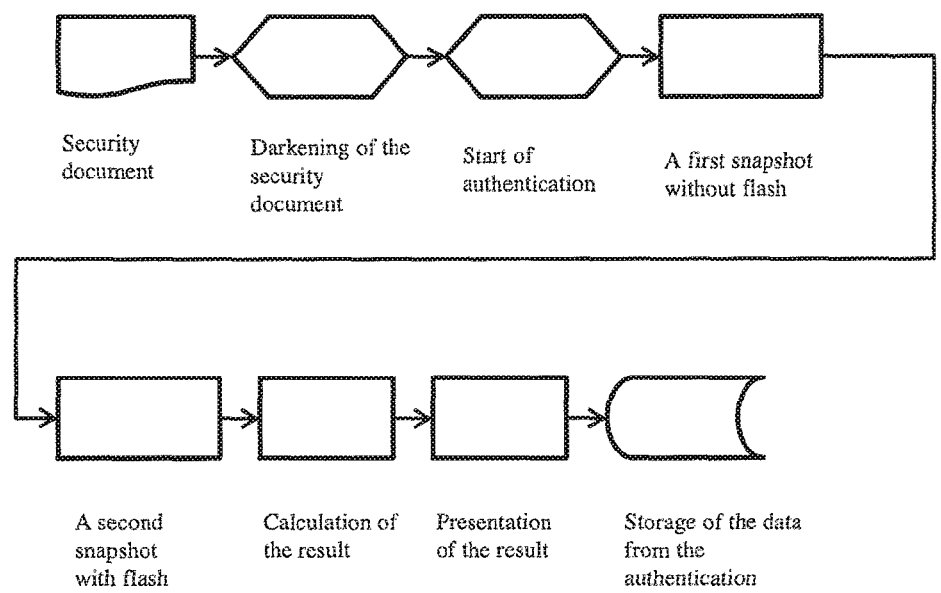
FIG. 4 shows a flowchart of the execution of the authentication program within the mobile telephone.

The individual steps as presented on the display are shown in FIG. 2e-2f. The alteration of the two states as a function of time, with the brightness being indicated along the vertical axis, is shown in FIG. 3. The individual steps are summarized as a flow diagram in FIG. 4.

Figure 5:
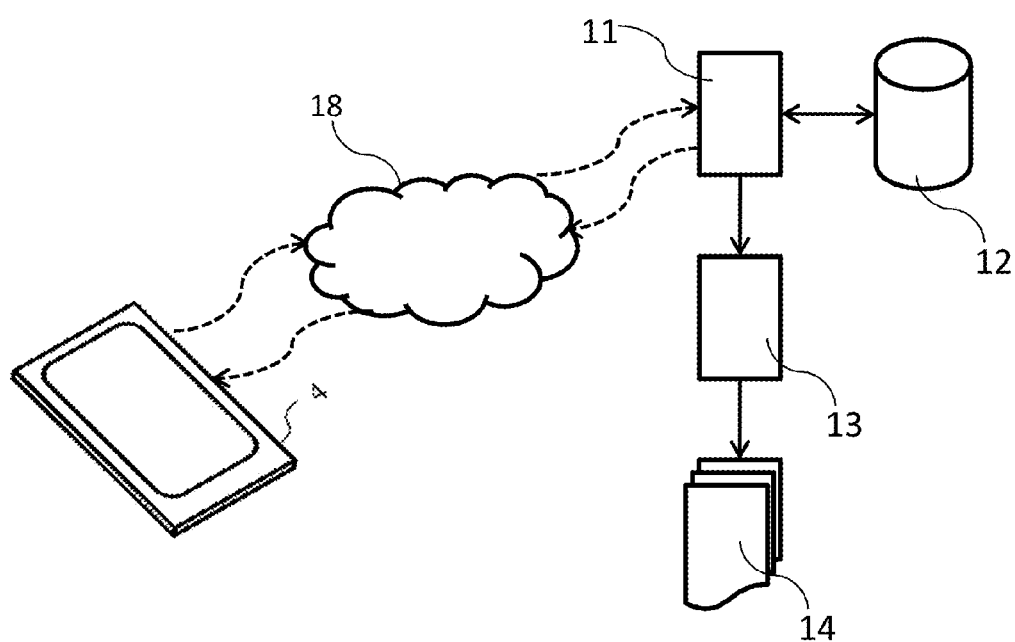
FIG. 5 shows the synchronization between mobile telephone and server and database and calculation for the authentication service using an automated payment system (pay-per-authentication) and dispatch of the authentication reports with the associated invoices.

At the same time, the result is transmitted by e-mail 18, a mobile telephone link or by another transmission option via the Internet (cf. FIG. 5) to a server 11, which makes the result available, via a database 12, to a further program 13 for billing for the verification service (invoices 14).

The invention claimed is:

1. A method for checking the genuineness of a photochromic security feature with a mobile telephone, the mobile telephone having a camera with an integrated flash function, the method comprising the following steps:
   I. taking at least one first image of the unexcited security feature using the camera of the mobile telephone; and
   II. exciting the security feature using the flash function of the mobile telephone to cause a change of color and/or change of shape of the security feature, and subsequently taking at least one second image of the thus excited security feature, using the camera of the same mobile telephone;
   with the proviso that the order of steps I. & II. may also be converse,
   wherein after step II, performing with the mobile telephone an authentication check from the at least one first image and the at least one second image using a data processing program on the mobile telephone, and outputting the result of this check by means of a display or an audio interface on the mobile telephone.

2. The method according to claim 1, wherein the method further comprises the following step:
   III. setting up a wireless link using a telephone function or an Internet function on the mobile telephone, and transmitting at least one of the first and second images or an authentication function derived from a difference between the at least one first image and the at least one second image to a receiver having a database, evaluating the authentication at the receiver and/or logging the authentication with the receiver.

3. The method according to claim 2, wherein after step II. or step III. the mobile telephone performs an authentication check from the at least one first image and the at least one second image using a suitable data processing program on the mobile telephone, and the result of this check is output by means of a display or an audio interface on the mobile telephone.

4. The method according to claim 2, wherein after step III., the receiver directly or indirectly outputs a report to at least one of the mobile telephone and a different communication path, the report comprising at least one of a statistical evaluation and invoicing.

5. The method according to claim 4, wherein the receiver outputs said report only after accumulation of a plurality of authentication processes.

6. The method according to claim 2, wherein after step III., the receiver transmits the result of the authentication to the mobile telephone and wherein this result is output on the mobile telephone on a display or by means of an audio interface.

7. The method according to claim 2, wherein the wireless link within the context of step III. is a protected Internet connection.

8. The method according to claim 2, wherein the mobile telephone executes a data processing program having an image recognition function which can ascertain both color alterations and shape-oriented alterations in the security feature and can evaluate relative differences between the first and second images, and wherein said data processing program accesses the database of the receiver.

9. The method according to claim 1, wherein the security feature is a security feature based on a retinal protein.

10. The method according to claim 9, wherein the security feature is a security feature based on bacteriorhodopsin, and wherein in step I. a dark-adapted state of the bacteriorhodopsin is measured using the first image and in step II. a light-adapted state of the bacteriorhodopsin is measured.

11. The method according to claim 10, wherein the light-adapted state is measured for more than one instant after the excitation.

12. The method according to claim 9, wherein the security feature is based on bacteriorhodopsin.

13. The method according to claim 9, wherein the security feature is based on bacteriorhodopsin in its form incorporated in purple membrane.

14. The method according to claim 1, wherein the images are taken and evaluated in the form of a film or in the form of at least one image within the context of step I., and at least two images taken with delayed timing within the context of step II.

15. The method according to claim 1, wherein the security feature is arranged on a security document, and wherein the security document is at least one taken from the group consisting of an identification document, a travel document, a banknote, a certificate, a cheque, a package, a guarantee certificate, or a share certificate.

16. The method according to claim 1, wherein prior to step I. the security feature is protected against an action of light, and step I. is performed immediately afterwards.

17. The method according to claim 1, wherein the flash function is an LED flash function.

18. The method according to claim 1, wherein a data processing program controls the method and runs on the mobile telephone, the data processing program calculating an authentication function from the at least one first image and the at least one second image.

19. The method according to claim 1, wherein the security feature is part of a security document.

20. The method according to claim 1, wherein a second security feature is simultaneously or sequentially picked up by the camera of the mobile telephone, the second security feature being visually detectable.

21. The method according to claim 20, wherein said second security feature is picked up while the authentication of the first feature is in progress, and wherein said second security feature is evaluated by a dedicated software module, as a result of which a second authentication result is provided on the basis of the second security feature.

22. The method according to claim 1, wherein the mobile telephone is a smartphone having a touch-sensitive display configured to initiate the data processing program which controls the authentication check.

23. The method according to claim 1, wherein the mobile telephone executes a data processing program having an image recognition function which can ascertain both color alterations and shape-oriented alterations in the security feature and can evaluate relative differences between the first and second images.

24. The method according to claim 23, wherein said data processing program accesses a local database arranged on the mobile telephone.

25. The method according to claim 1, wherein the mobile telephone carries out at least one of an automated relative positioning and scaling of the first and second images using a pattern recognition function on the mobile telephone.

26. The method according to claim 1, comprising:
subsequently to taking the first image, causing the display to instruct a user to make the first image shown as background overlap the display and to take the second image only when this overlap has been ensured.

27. A computer program product comprising a non-transient data carrier storing a data processing program which is executable on a mobile telephone for carrying out a method for checking the genuineness of a photochromic security feature, the mobile telephone having a camera with an integrated flash function, the method comprising the following steps:
I. taking at least one first image of the unexcited security feature using a the camera of the mobile telephone;
II. exciting the security feature using the flash function of the mobile telephone to cause a change of color and/or change of shape of the security feature, and subsequently taking at least one second image of the thus excited security feature, using the camera of the same mobile telephone;
with the proviso that the order of steps I. & II. may also be converse,
wherein after step II, performing with the mobile telephone an authentication check from the at least one first image and the at least one second image using a data processing program on the mobile telephone, and outputting the result of this check by means of a display or an audio interface on the mobile telephone.

28. The computer program product according to claim 27, wherein the mobile telephone carries out at least one of an automated relative positioning and scaling of the first and second images using a pattern recognition function on the mobile telephone.

29. The computer program product according to claim 27, wherein the method carried out by the data processing program comprises:
subsequently to taking the first image, causing the display to instruct a user to make the first image shown as background overlap the display and to take the second image only when this overlap has been ensured.

30. A mobile telephone comprising a camera with an integrated flash function, the mobile telephone comprising a memory storing a data processing program which is executable on said mobile telephone for carrying out a method for checking the genuineness of a photochromic security feature, the method comprising the following steps:
I. taking at least one first image of the unexcited security feature using the camera of the mobile telephone; and
II. exciting the security feature using the flash function of the mobile telephone to cause a change of color and/or change of shape of the security feature, and subsequently taking at least one second image of the thus excited security feature, using the camera of the same mobile telephone;
with the proviso that the order of steps I. & II. may also be converse, wherein after step II, performing with the mobile telephone an authentication check from the at least one first image and the at least one second image using a data processing program on the mobile telephone, and outputting the result of this check by means of a display or an audio interface on the mobile telephone.

31. The mobile telephone according to claim 30, wherein the mobile telephone is configured to carry out at least one of an automated relative positioning and scaling of the first and second images using a pattern recognition function on the mobile telephone.

32. The mobile telephone according to claim 30, wherein the method carried out by the data processing program comprises:
  subsequently to taking the first image, causing the display to instruct a user to make the first image shown as background overlap the display and to take the second image only when this overlap has been ensured.

* * * * *